United States Patent [19]

Miyakawa et al.

[11] Patent Number: 4,486,206
[45] Date of Patent: Dec. 4, 1984

[54] CYCLONE TYPE AIR CLEANER

[75] Inventors: Susumu Miyakawa, Kariya; Hajime Akado, Anjo; Yoshihiro Taki, Nagoya; Kenji Hikida, Chiryu; Toshiaki Nakayama, Kariya, all of Japan

[73] Assignee: Nippondenso Co., Ltd., Kariya, Japan

[21] Appl. No.: 511,007

[22] Filed: Jul. 5, 1983

[30] Foreign Application Priority Data

Jul. 7, 1982 [JP] Japan .................. 57-118824

[51] Int. Cl.$^3$ ............................................. B01D 50/00
[52] U.S. Cl. ........................................ 55/337; 55/498
[58] Field of Search .................. 55/52, 204, 337, 498, 55/205, 424, 426; 210/512.1

[56] References Cited

U.S. PATENT DOCUMENTS

| 2,943,698 | 7/1960 | Bishop | 55/337 |
|---|---|---|---|
| 3,078,650 | 2/1963 | Anderson et al. | 55/337 |
| 3,293,830 | 12/1966 | McKinlay | 55/498 X |
| 3,845,840 | 11/1974 | Thrasher | 55/337 X |
| 4,097,381 | 6/1978 | Ritzler | 210/512.1 X |
| 4,217,118 | 8/1980 | Kopf | 55/337 X |
| 4,303,421 | 12/1981 | Cerroni | 55/290 |
| 4,357,242 | 11/1982 | Chandler | 210/512.1 X |

Primary Examiner—Charles Hart
Attorney, Agent, or Firm—Cushman, Darby & Cushman

[57] ABSTRACT

A cyclone type air cleaner has a cylindrical housing having a tangential air inlet formed in the peripheral wall of the housing and an air outlet formed in the upper end wall thereof. A downwardly converging frusto-conical member having a central opening is disposed in the housing coaxially therewith to divide the interior of the housing into a first or upper swirling chamber and a lower space in which a cylindrical or annular member is disposed coaxially with the central opening to define therein a second or lower swirling chamber communicated with the upper swirling chamber through the central opening. The cylindrical or annular member cooperates with the housing peripheral wall to define a dust-collecting chamber communicated with the lower swirling chamber through an annular gap defined between the frusto-conical member and the cylindrical or annular member. An axial flow type filter element is disposed between the upper swirling chamber and the air outlet.

12 Claims, 13 Drawing Figures

CYCLONE TYPE AIR CLEANER

BACKGROUND OF THE INVENTION

The present invention relates to an air cleaner and, more particularly, to a cyclone type air cleaner for cleaning air be separating dust particles and other foreign matters from air by making use of centrifugal force.

As is well known to those skilled in the art, a cyclone type air cleaner is constructed such that the air suspending dust particles and other foreign matters (referred to as "contaminated air" hereinunder) is introduced into a cylindrical housing defining a swirling chamber is caused to flow through the swirling chamber while swirling so that the dust particles and other foreign matters are separated from the air by the centrifugal force. In order to increase the centrifugal separation effect, therefore, it has been necessary to increase the size and, particularly, the axial length or height of the housing.

On the other hand, there is an increasing demand for reduction in size and weight of the air cleaners. To comply with this demand, it is necessary to reduce the size and, particularly, the height of the cylindrical housing. The reduced size of the cylindrical housing, however, undesirably impairs the swirling action and, hence, the centrifugal separation effect, resulting in a lowered dust separation efficiency to heavily burden an air filter element dispased in the downstream end of the housing as viewed in the direction of the flow of air.

SUMMARY OF THE INVENTION

Accordingly, an object of the invention is to provide a cyclone type air cleaner which is improved to overcome the above-described problem of the prior art.

The cyclone type air cleaner according to the invention has a housing defining a swirling chamber for causing contaminated air to swirl therein thereby to separate dust particles from the air by the centrifugal separation effect, wherein the improvement comprises a second swirling chamber disposed beneath the first-mentioned swirling chamber, and a dust-collecting chamber provided around the second swirling chamber.

The above and other objects, features and advantages of the invention will become clear from the following description of the preferred embodiments taken in conjunction with the accompanying drawings.

DESCRIPTION OF THE PREFERRED EMBODIMENTS

Figure 1:
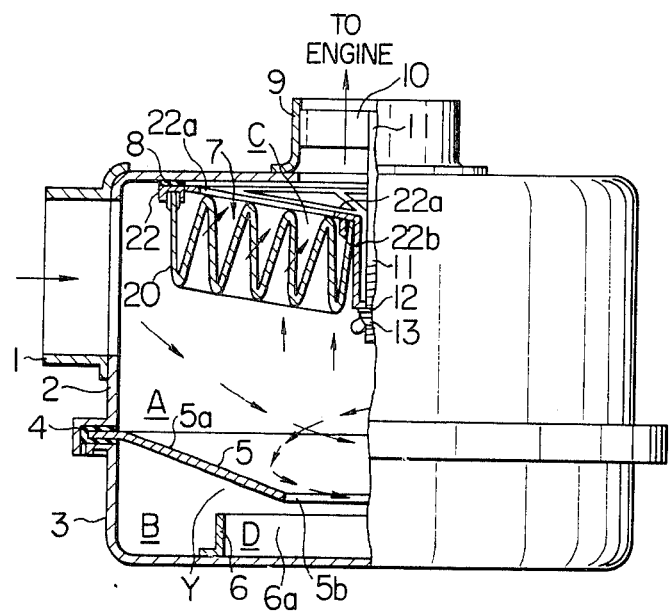
FIG. 1 is a partly-sectional side elevation of a first embodiment of the cyclone type air cleaner in accordance with the invention.
Figure 2:
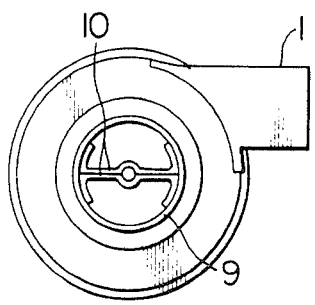
FIG. 2 is a plan view of the cyclone type air cleaner shown in FIG. 1.

Referring first to FIGS. 1 and 2 showing a first embodiment, a cyclone type air cleaner has a cap 2 and a dust pan 3 which are jointed to each other at their peripheral flanges of the open ends thereof to form a housing. The cap 2 has an opening formed in the peripheral wall thereof, to which an intake pipe 1 is connected tangentially to the peripheral wall of the cap 2. The cap 2 is provided also with an opening formed in the top wall thereof, to which is connected an outlet pipe 9. A frusto-conical member 5 is clamped at its peripheral edge between the peripheral flanges of the cap 2 and the dust pan 3 with a seal ring 4 sandwiched therebetween. The frusto-conical member 5 has a frusto-conical wall 5a converging downwardly to a circular opening 5b defined by the lower peripheral edge of the frusto-conical wall 5a. The frusto-conical member 5 divides the space in the housing into two sections; namely, a swirling chamber A on the upper side of the member 5 and a dust collecting chamber B on the lower side of the member 5. A cylindrical member 6 is disposed in the dust-collecting chamber B and fixed by welding to the inner surface of the bottom wall of the dust pan 3 to extend upwarly therefrom. The space defined in the cylindrical member 6 constitutes a second-swirling chamber D, the function of which will be described later. The cylindrical member 6 has a circular opening 6a of a diameter greater than that of the opening 5b in the frusto-conical member 5. An annular gap Y is formed betwee the lower surface of the frusto-conical wall 5a and the upper end of the cylindrical member 6.

Figure 3:
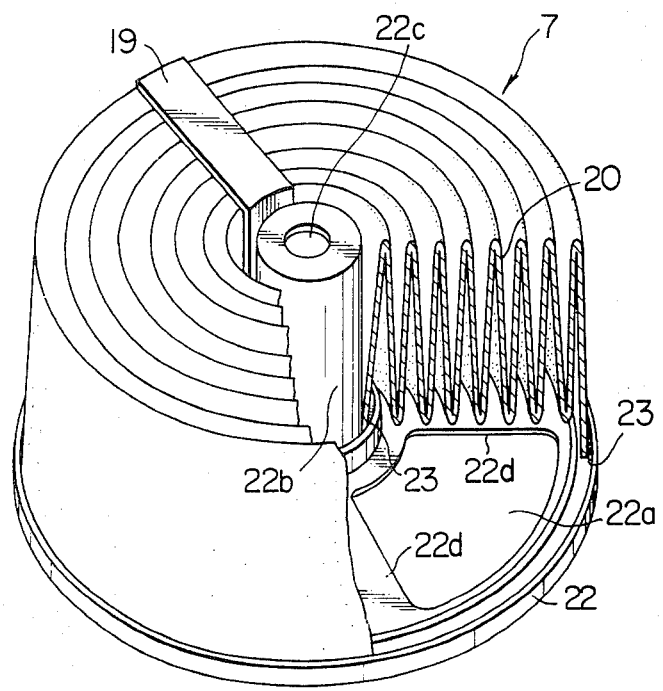
FIG. 3 is a perspective view of a filter element assembly incorporated in the cyclone type air cleaner shown in FIG. 1.

The air cleaner further has an axial-flow type filter element assembly 7. As will be seen in FIG. 3, the filter element assembly 7 has a filter element 20 having a generally ring-shaped outer configuration and an end plate 22 which is provided at its central portion with a cylindrical column 22b having a top wall in which is formed an aperture 22c for receiving a bolt 11 as shown in FIG. 1. The end plate 22 has a plurality of radial ribs 22d so that a plurality of sector-shaped openings 22a are formed between adjacent radial ribs 22d. In the use of the filter element assembly, air flows through these sector-shaped openings 22a. The filter element 20 and the end plate 22 are bonded to each other by an adhesive 23.

The filter element assembly 7 is fixed to the inner surface of the bottom wall of the cap 2 by means of the aforementioned bolt 11, a butterfly nut 13 and a washer 12. A seal ring 8 is provided between the inner surface of the bottom wall of the cap 2 and the peripheral portion of the end plate 22 of the filter element 7 to form an airtight seal therebetween. A pair of support plates 10 are secured at their ends to the inner peripheral surface of the outlet pipe 9 and extend diametrically in the outlet pipe 9. These support plates 10 are jointed face-to-face to form therebetween an axial hole concentric to the outlet pipe 9. The bolt 11 extends through this bore and is supported stably by the support plates 10. These flanges of the cap 2 and the dust pan 3 are fastened to each other by means of a plurality of conventional clamps (not shown) so that the cap 2 and the dust pan 3 can easily be separated from each other by releasing the clamps as required.

Figure 4:
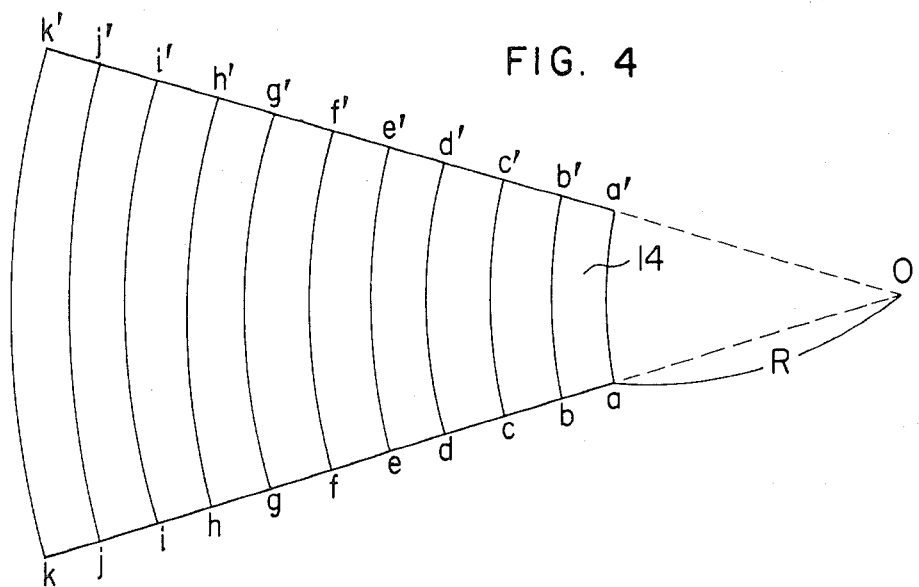
FIGS. 4 to 6 diagrammatically illustrate the steps of fabrication of the filter element.
Figure 5:
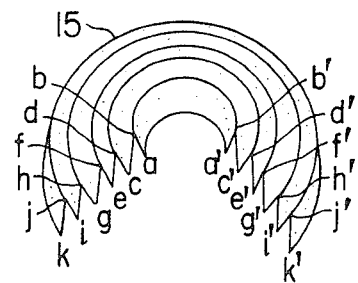
Figure 6:
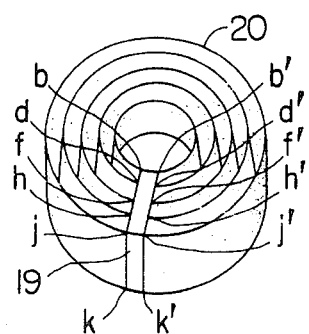

An explanation will be made hereinunder as to how the filter element 20 of the filter element assembly 7 is fabricated. With specific reference to FIGS. 4 to 6, a sector-shaped blank 14 of the filter element 20 is prepared as shown in FIG. 4 from a sheet of filtrating material. The blank 14 has a shorter inner arcuate edge a—a' the length of which coincides substantially with the circumferential length of the inner peripheral edge of the filter element 20 and a longer outer arcuate edge k—k' the length of which coincides substantially with the circumferential length of the outer peripheral edge of the filter element 20. Arcuate crease lines b—b' through j—j' are formed in the blank 14 at a constant radial pitch and in parallel with the smaller and larger arcuate edges a—a' and k—k'. The radius R of curvature of the smaller arcuate edge a—a' is determined in accordance with the inside diameter and the outside diameter of the filter element 20 of the filter element assembly 7. The blank 14 is then pleated up and down alternatingly along the crease lines to form a preform 15 as shown in FIG. 5. Finally, the opposing edges a-k and a'-k' are bonded to each other by means of a resin 19 so that an axial-flow type filter element 20 is formed as shown in FIG. 6. The crease lines along the arcs b—b' through j—j' can be formed by a known creasing roller or any other known means such as a press under application of heat.

The operation of the described embodiment of the cyclone type air cleaner is as follows: The contaminated air to be cleaned is first introduced through the intake pipe 1 into the cap 2 in a direction tangential thereto. The air then flows as indicated by arrows in FIG. 1 and is caused to swirl within the swirling chamber A as it is guided by the frusto-conical wall 5a of the frusto-conical member 5. The swirling air is then introduced into the second-swirling chamber D through the opening 5b in the frusto-conical member 5 and is caused to swirl further within the second-swirling chamber D. During the swirling in the second-swirling chamber D, comparatively large and heavy dust particles are concentrated to the outermost region of the swirl due to the action of the centrifugal force and are separated from the air. The separated dust particles are thrown through the annular gap Y into the dust-collecting chamber B and collected therein. The air now free from the large and heavy dust particles but still containing comparatively small and light dust particles is then caused to flow through the filter element 20 of the filter element assembly 7 so that the comparatively small and light dust particles are arrested and removed by the filter element 20. The thus cleaned air flows out of the filter element assembly 7 and into an internal combustion engine (not shown) through the discharge pipe 9 open to the downstream side C of the filter element 7.

The dust collected at the dust-collecting chamber B can be easily disposed as required by releasing the clamps to remove the dust pan 3 from the cap 2.

The cylindrical member 6 constitutes an essential part of the described embodiment of the cyclone type air cleaner. An experiment was conducted in accordance with a test method specified in JIS (Japanese Industrial Standard) D 1612 to verify the effect produced by the cylindrical member 6. Powder of eighth type specified in JIS Z 8901 was used as the dust particles in the experiment. The cyclone type air cleaner of the described embodiment having the cylindrical member 6 showed a dust separation efficiency of about 50%, while a comparison air cleaner having an identical construction but without the cylindrical member showed a dust separation efficiency of as low as about 20%.

Figure 7:
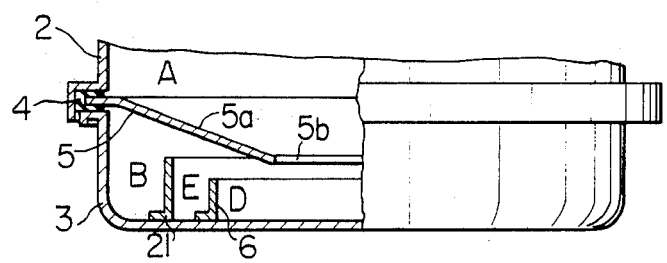
FIG. 7 is a partly sectional side elevation of a second embodiment of the cyclone type air cleaner in accordance with the invention.

FIG. 7 shows a second embodiment of the cyclone type claner of the invention. This embodiment has a construction substantially identical to that of the first embodiment except that another cylindrical member 21 of a diameter and height greater than those of thw cylindrical member 6 is fixed by welding to the bottom wall of the dust pan 3 so as to surround the cylindrical member 6 so that an annular dust chamber E is formed between the cylindrical member 6 and the cylindrical member 21. In this embodiment, the separated dust particles are collected also in the dust chamber E.

Figure 8A:
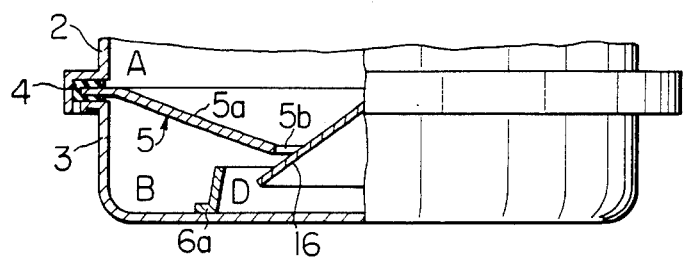
FIG. 8A is a partly sectional side elevation of a third embodiment of the cyclone type air cleaner in accordance with the invention.
Figure 8B:
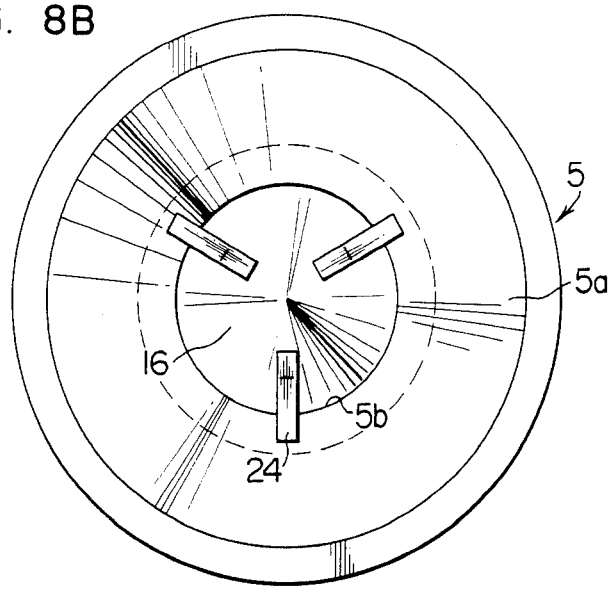
FIG. 8B is a plan view of a part of the air cleaner shown in FIG. 8A, illustrating an inversed conical member and a frusto-conical member connected with each other.
Figure 8C:
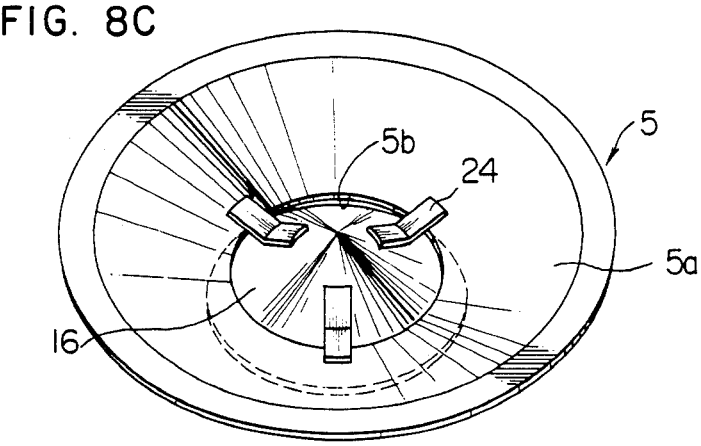
FIG. 8C is a perspective view of the part of the cleaner shown in FIG. 8B.

FIGS. 8A to 8C show a third embodiment of the cyclone type air cleaner of the invention. In this embodiment, a frusto-conical member 6a having an upwardly converging frusto-conical wall is used in place of the cylindrical member 6 used in the preceding embodiments. The frusto-conical wall of the member 6a defines a second-swirling chamber D as in the case of the first embodiment and serves to increase the centrifugal separation effect as the radius of the swirl is gradually decreased as the air swirls along the peripheral wall of the second-swirling chamber D. In addition, an upwardly converging conical interceptor 16 is fixed to the frusto-conical member 5 by brackets 24 as shown in FIG. 8B to enhance the cyclone effect of the air cleaner. Namely, the conical interceptor 16 serves to intercept any dust particles which tend to flow out of the dust-collecting chamber B, to thereby increase the separation effect. The construction of the upper part of the air cleaner which is omitted from FIG. 8A is identical to that shown in FIG. 1.

Figure 9:
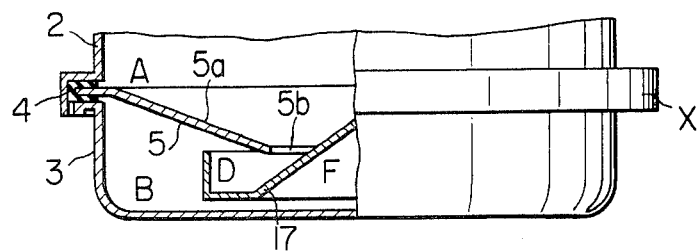
FIGS. 9 to 11 are partly sectional side elevations of futher embodiments of the cyclone type air cleaner in accordance with the invention.
Figure 10:
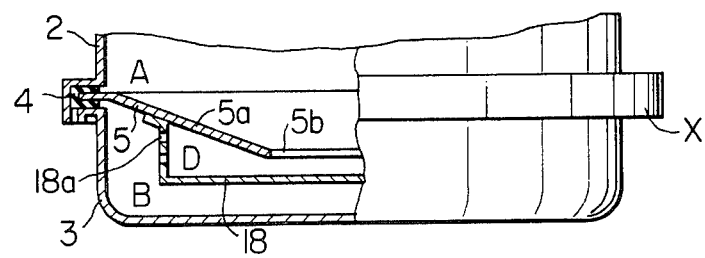
Figure 11:
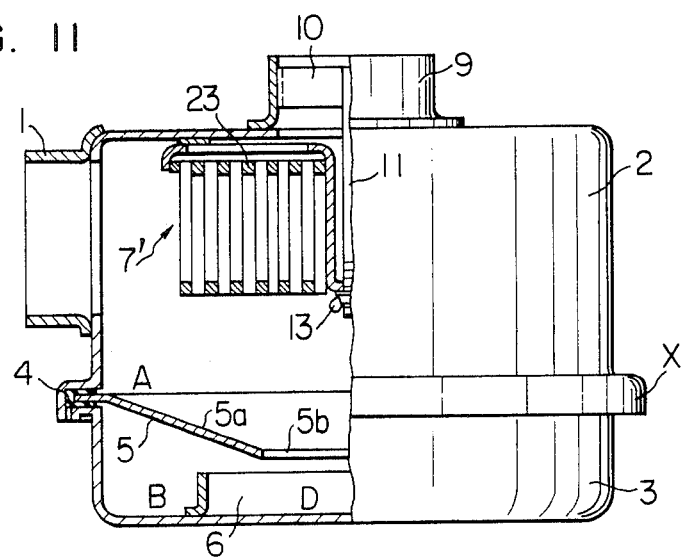

FIGS. 9 to 11 show further embodiments of the invention. In the embodiment shown in FIG. 9, a single conical member 17 is used to play the roles of both of the conical interceptor 16 and the cylindrical member 6 in the third embodiment shown in FIG. 8A. The conical member 17 is connected to the frusto-conical member 5 by brackets not shown but similar to those shown in FIG. 8B. In this embodiment, the contaminated air containing dust particles is caused to swirl in the swirling chamber constituted by the space around the conical member 17 so that comparatively large and heavy dust particles are centrifugally separated and thrown into the dust-collecting chamber B and also into a space F formed under the conical member 17. It is thus possible to remarkably improve the cyclone effect of the air cleaner. The construction of the upper part of the air cleaner which is omitted from FIG. 9 is identical to that of the first embodiment shown in FIG. 1.

In the embodiment shown in FIG. 10, a pan-shaped member 18 is fixed by welding to the undersurface of the frusto-conical member 5. The pan-shaped member 18 has a cylindrical peripheral wall formed therein with a multiplicity of apertures 18a. In this embodiment, the dust particles are caused to fly into the dust-collecting chamber B through the apertures 18a during the swirling of the contaminated air within the swirling chambe D. The cylindrical peripheral wall having the apertures 18a serves to prevent the separated dust particles from entering again into the dust-collecting chamber B.

The construction of the upper part of this embodiment omitted from FIG. 10 is identical to that of the first embodiment shown in FIG. 1.

In the embodiment shown in FIG. 11, a spiral filter element assembly 7' is used in place of the filter element assembly 7 incorporated in the preceding embodiments described. The filter element assembly 7' is fabricated by bonding a corrugated sheet and a flat sheet to each other by an adhesive 23 to form a laminated sheet and then winding the laminated sheet in a spiral form as shown, for example, in Japanese Utility Model Publication No. 51937/1981.

As has been described, the prsent invention provides an improved cyclone type air cleaner in which a second-swirling chamber D is provided besides the swirling chamber A used in the conventional air cleaner, so that the number of turns of the swirl is increased to enhance the centrifugal separation effect. In addition, the air cleaner of the invention provides an equal or even a higher dust separation efficiency with reduced axial dimension of the air cleaner housing. Furthermore, the dust-collecting chamber B disposed around the sub-swirling chamber D is effective to assure that the overall hight of the air cleaner can be reduced with the dust separation efficiency kept unchanged.

The described embodiments are only illustrative and various changes and modifications may be imparted thereto.

For instance, it is possible to use a conventional radial-flow type filter element in place of the axial-flow filter element used in each of the described embodiments. The axial-flow type filter element used in each embodiment may be the one disclosed in Japanese Patent Publication No. 29206/1982. It is also possible to strengthen the swirling of the contaminated air by providing guide vanes within the cap 2.

Other changes and modifications are still possible within the scope of the invention which is limited solely by the appended claims.

What is claimed is:

1. A cyclone type air cleaner including:
   a housing defining therein a swirling chamber for causing air to swirl therein to thereby centrifugally separate dust particles from the air,
   wherein the improvement comprises:
   a second swirling chamber disposed beneath the first-said swirling chamber;
   a dust-collecting chamber provided around said second swirling chamber;
   said housing having upper and lower end walls and a substantially cylindrical peripheral wall and being provided with an air inlet substantially tangential to said cylindrical wall;
   an air outlet being formed in said upper end wall substantially coaxially therewith;
   a downwardly converging frusto-conical member having a bottom end defining therein a central opening being provided in said housing substantially coaxially therewith and between said first and second swirling chambers so that said first and second swirling chambers are communicated with each other through said central opening;
   an annular member of a diameter greater than that of said central opening being provided in said housing beneath said frusto-conical member and substantially coaxially therewith to define therein said second swirling chamber, said annular member cooperating with said housing to define therebetween said dust-collecting chamber;
   said annular member further cooperating with said frusto-conical member to define therebetween a substantially annular gap through which said second swirling chamber and said dust-collecting chamber are communicated.

2. A cyclone type air cleaner according to claim 1, further including another annular member disposed in said dust-collecting chamber substantially coaxially with first-said annular member to divide said dust-collecting member into two substantially annular dust-collecting chambers.

3. A cyclone type air cleaner according to claim 1, further including an upwardly converging conical member disposed substantially coaxially with said downwardly converging frust-conical member and extending through said central opening partly into first-said swirling chamber and partly into said second swirling chamber, said conical member cooperating with the bottom end of said frust-conical member to define therebetween a substantially annular gap through which said first and second swirling chambers are communicated.

4. A cyclone type air cleaner according to claim 1, wherein said annular member has a bottom end secured to said lower end wall of said housing.

5. A cyclone type air cleaner according to claim 2, wherein said the other annular member has a bottom end secured to said lower end wall of said housing.

6. A cyclone type air cleaner according to claim 1, further including an axial flow type filter element disposed between first-said swirling chamber and said air outlet and having a plurality of substantially circumferentially extending pleats.

7. A cyclone type air cleaner including:
   a housing defining therein a swirling chamber for causing air to swirl therein to thereby centrifugally separate dust particles from the air;
   wherein the improvement comprises:
   a second swirling chamber disposed beneath the first-said swirling chamber;
   a dust-collecting chamber provided around said second swirling chamber;
   said housing having upper and lower end walls and a substantially cylindrical peripheral wall and being provided with an air inlet substantially tangential to said cylindrical wall;
   and air outlet being formed in said upper end wall substantially coaxially therewith;
   a downwardly converging frusto-conical member having a bottom end defining therein a central opening being provided in said housing substantially coaxially therewith and between said first and second swirling chambers so that said first and second swirling chambers are communicated with each other through said central opening;
   a generally conical member being disposed substantially coaxially with said frusto-conical member and including an upwardly converging conical portion disposed substantially coaxially with said central opening and extending therethrough partly into first-said swirling chamber;
   said conical portion cooperating with the bottom end of said frusto-conical member to define a substantially annular gap therebetween;
   said conical member also including a substantially cylindrical wall portion integral with said conical portion and cooperating therewith to define said second swirling chamber communicated with first-said swirling chamber through said annular gap;

said cylindrical wall portion having a diameter greater than that of said central opening.

8. A cyclone type air cleaner according to claim 7, wherein said conical portion and cylindrical wall portion have bottom ends interconnected by an integral annular portion spaced axially inwardly from said lower end wall of said housing.

9. A cyclone type air cleaner according to claim 7, further including an axial flow type filter element disposed between first-said swirling chamber and said air outlet and having a plurality of substantially circumferentially extending pleats.

10. A cyclone type air cleaner including:

a housing defining therein a swirling chamber for causing air to swirl therein to thereby centrifugally separate dust particles from the air, wherein the improvement comprises:

a second swirling chamber disposed beneath the first-said swirling chamber;

a dust-collecting chamber provided around said second swirling chamber;

said housing having upper and lower end walls and a substantially cylindrical peripheral wall and being provided with an air inlet substantially tangential to said cylindrical wall;

an air outlet formed in said upper end wall substantially coaxially therewith;

a downwardly converging frusto-conical member having a bottom end defining therein a central opening being provided in said housing substantially coaxially therewith and between said first and second swirling chambers so that said first and second swirling chambers are communicated with each other through said central opening;

a generally pan-shaped member being disposed beneath said frusto-conical member substantially coaxially with said central opening;

said pan-shaped member including a substantially cylindrical wall portion and a substantially circular bottom wall portion opposed to said central opening;

said cylindrical wall portion having a diameter greater than that of said central opening and having an upper end connected to said frusto-conical member;

said pan-shaped member cooperating with said frusto-conical member to define said second swirling chamber;

said cylindrical wall portion being radially inwardly spaced from the peripheral wall of said housing to cooperate therewith to define said dust-collecting chamber;

said cylindrical wall portion being formed therein with a plurality of aperatures through which said second swirling chamber and said dust-collecting chamber are communicated.

11. A cyclone type air cleaner according to claim 10, wherein said bottom wall portion of said pan-shaped member is axially inardly spaced from the lower end wall of said housing.

12. A cyclone type air cleaner according to claim 10, further including an axial flow type filter element disposed between first-said swirling chamber and said air outlet and having a plurality of substantially circumferentially extending pleats.

* * * * *